US007127425B1

(12) United States Patent
Wilson

(10) Patent No.: US 7,127,425 B1
(45) Date of Patent: Oct. 24, 2006

(54) SYSTEM AND METHOD FOR PROVIDING A LOAN TO A TAXPAYER BASED ON A PRE YEAR-END TAX REFUND

(75) Inventor: Robert D. Wilson, Shawnee, KS (US)

(73) Assignee: H & R Block Tax Services, Inc., Kansas City, MO (US)

( * ) Notice: Subject to any disclaimer, the term of this patent is extended or adjusted under 35 U.S.C. 154(b) by 0 days.

(21) Appl. No.: 09/483,666

(22) Filed: Jan. 14, 2000

(51) Int. Cl.
*G06Q 40/00* (2006.01)
*G06F 17/22* (2006.01)
(52) U.S. Cl. .............................. 705/38; 705/31; 705/35
(58) Field of Classification Search ................. 705/31, 705/35, 38, 30, 19, 40; 235/380; 708/100; 707/100
See application file for complete search history.

(56) References Cited

U.S. PATENT DOCUMENTS

| | | | |
|---|---|---|---|
| 3,596,256 A | | 7/1971 | Alpelt |
| 4,718,009 A | | 1/1988 | Cuervo |
| 4,890,228 A | * | 12/1989 | Longfield .................... 705/31 |
| 5,025,138 A | | 6/1991 | Cuervo |
| 5,025,372 A | | 6/1991 | Burton et al. |
| 5,138,549 A | | 8/1992 | Bern |
| 5,193,057 A | | 3/1993 | Longfield |
| 5,206,803 A | | 4/1993 | Vitagliano et al. |
| 5,394,487 A | * | 2/1995 | Burger et al. ............... 382/309 |
| 5,644,727 A | * | 7/1997 | Atkins .......................... 705/40 |
| 5,724,523 A | | 3/1998 | Longfield |
| 5,739,512 A | | 4/1998 | Tognazzini |
| 5,772,251 A | * | 6/1998 | Fleck ......................... 283/115 |
| 5,787,404 A | | 7/1998 | Fernandez-Holmann |
| 5,787,405 A | | 7/1998 | Gregory |
| 5,878,405 A | | 3/1999 | Grant et al. |
| 5,903,876 A | | 5/1999 | Hagemier |
| 5,946,668 A | * | 8/1999 | George ......................... 705/38 |
| 5,963,921 A | | 10/1999 | Longfield |
| 5,991,736 A | | 11/1999 | Ferguson et al. |
| 6,019,283 A | | 2/2000 | Lucero |
| 6,021,397 A | * | 2/2000 | Jones et al. ................... 705/36 |
| 6,064,983 A | * | 5/2000 | Koehler ....................... 705/31 |

(Continued)

FOREIGN PATENT DOCUMENTS

GB   2251100 A  *  12/1990

(Continued)

OTHER PUBLICATIONS

"1040-ES: Estimated Tax for Individuals 1998"; Department of the Treasury Internal Revenue Service; pp. 1-7.*

(Continued)

*Primary Examiner*—Ella Colbert
(74) *Attorney, Agent, or Firm*—Standley Law Group LLP

(57) ABSTRACT

A system and method for providing to a taxpayer a loan in an amount based on the taxpayer's estimated tax refund amount due for a current year, the loan being provided to the taxpayer prior to year end of the current tax year and prior to completion and filing of the taxpayer's current year tax return forms with a taxing authority. The taxpayer's estimated tax refund may be based on historical tax refund data as well as current year income data. A loan granting entity may consider the level of tax refunds that the taxpayer has received in previous years as well as income data for the first three quarters of the year to determine a reasonable estimate of the tax refund amount that the taxpayer will likely receive for the current tax year.

20 Claims, 2 Drawing Sheets

U.S. PATENT DOCUMENTS

| | | | |
|---|---|---|---|
| 6,070,153 | A | 5/2000 | Simpson |
| 6,105,007 | A | 8/2000 | Norris |
| 6,105,865 | A | 8/2000 | Hardesty |
| 6,182,891 | B1 | 2/2001 | Furuhashi et al. |
| 6,202,052 | B1 * | 3/2001 | Miller .......................... 705/31 |
| 6,473,500 | B1 | 10/2002 | Risafi et al. |
| 6,473,741 | B1 * | 10/2002 | Baker .......................... 705/31 |
| 6,532,450 | B1 * | 3/2003 | Brown et al. ................. 705/40 |
| 7,010,507 | B1 * | 3/2006 | Anderson et al. ............. 705/31 |

FOREIGN PATENT DOCUMENTS

| | | |
|---|---|---|
| WO | WO-98/28699 A1 | 7/1998 |

OTHER PUBLICATIONS

H & R Block TaxCut Press Release; 1999 Tax Season Releases; http://www.taxcut.com/taxcut/99_press_releases/99pr_h_and bships.html; pp. 1-2.*

Union Bank Offers Assistance Program for Customers Affected by Southland Fires, Business Wire, Oct. 29, 1993.

First Interstate Bank Will Donate $1 Million to Earthquake Relief, Offer Financial Aid to Earthquake Victims, PR Newswire, p0118LA025, Jan. 18, 1994.

Taxless Innovations Give Postal Service Run for its Money, PR Newswire, 0309SD005, Mar. 9, 1990.

Giovetti, How to File Your Tax Return Electronically, Compute, v15, n4, pS9(3), Apr. 1993.

Gellis, Harold C., "How to Get Plugged into Electronic Tax Filing", Journal of Accountancy v17n6PP56-60, Jun. 1991, Dialog file 15 Accession No. 00553977.

Mannix, "It's payback time", U.S. News & World Report, 1994, vol 117, No. 11, p. 77.

Kemp, "Discovers Debuts It's First Platinum card", DM News, Jan. 4, 1999, p. 2.

"Discover's Platinum May Stand Out in the Platinum Crowd", Credit Card News, Jan. 15, 1999.

"Your Platinum Partner Certificate Has Arrived", Discover Financial Services, Inc., date unknown.

* cited by examiner

SYSTEM AND METHOD FOR PROVIDING A LOAN TO A TAXPAYER BASED ON A PRE YEAR-END TAX REFUND

BACKGROUND AND SUMMARY OF THE INVENTION

The present invention relates generally to a tax refund system, and more particularly, to a system in which a taxpayer receives a loan based on his or her estimated tax refund prior to the year end holidays of the calendar year preceding the year in which the taxpayer files his or her tax return forms. In a preferred embodiment of the present invention a taxpayer may have an estimated refund amount in their possession prior to the December holidays and prior to filing his or her tax return forms for that tax year.

Tax refunds are available when a taxpayer pays too much tax during a tax year. By completing tax return forms and filing them with the proper taxing authority, the taxpayer may receive a refund for the amount overpaid. Often taxpayers use tax preparation companies to prepare and electronically file their tax return forms with the taxing authority. In circumstances where a taxpayer has used a tax preparation company on repeated and consecutive years, the tax preparation company may be able to estimate the amount of a tax refund the taxpayer will be entitled to receive for the current tax year, prior to the completion of that tax year. By doing a trend analysis as well as looking at current year income levels, the tax preparation company can arrive at a reasonable approximation of the amount of tax refund the taxpayer will be entitled to receive for that tax year. In exchange for the taxpayer assigning the tax refund amount to the tax preparation company or lending entity, the tax preparation company by itself or through a financial institution may provide the taxpayer with a loan in an amount less than, or equal to or greater than the estimated tax refund amount due the taxpayer for that tax year.

Refund anticipation loans are known, in which a taxpayer receives a loan in anticipation of a tax refund due. However, in these situations the tax information is completed for the tax year for which the refund is due prior to the loan being granted to the taxpayer. In other words, the tax preparation company has completed the tax return forms necessary to file with the taxing authority before the loan is approved. This is contrary to the present invention in which the tax return forms are not able to be completed because the year end information is not yet known. Instead, with the present invention, a loan is provided to the taxpayer based on trend analysis from prior year's tax returns as well as other personal information supplied by the taxpayer. In this manner, with the present invention, taxpayers may receive a loan prior to the year-end holidays in order to be able to spend the anticipated tax refund for holiday shopping.

The present invention will be described in greater detail hereinafter. The present invention is described in the form of preferred embodiments and is not to be limited to those preferred embodiments but instead shall be given the broadest scope of protection affordable under the law in view of the allowed claims.

DETAIL DESCRIPTION OF PREFERRED EMBODIMENT(S)

Figure 1:
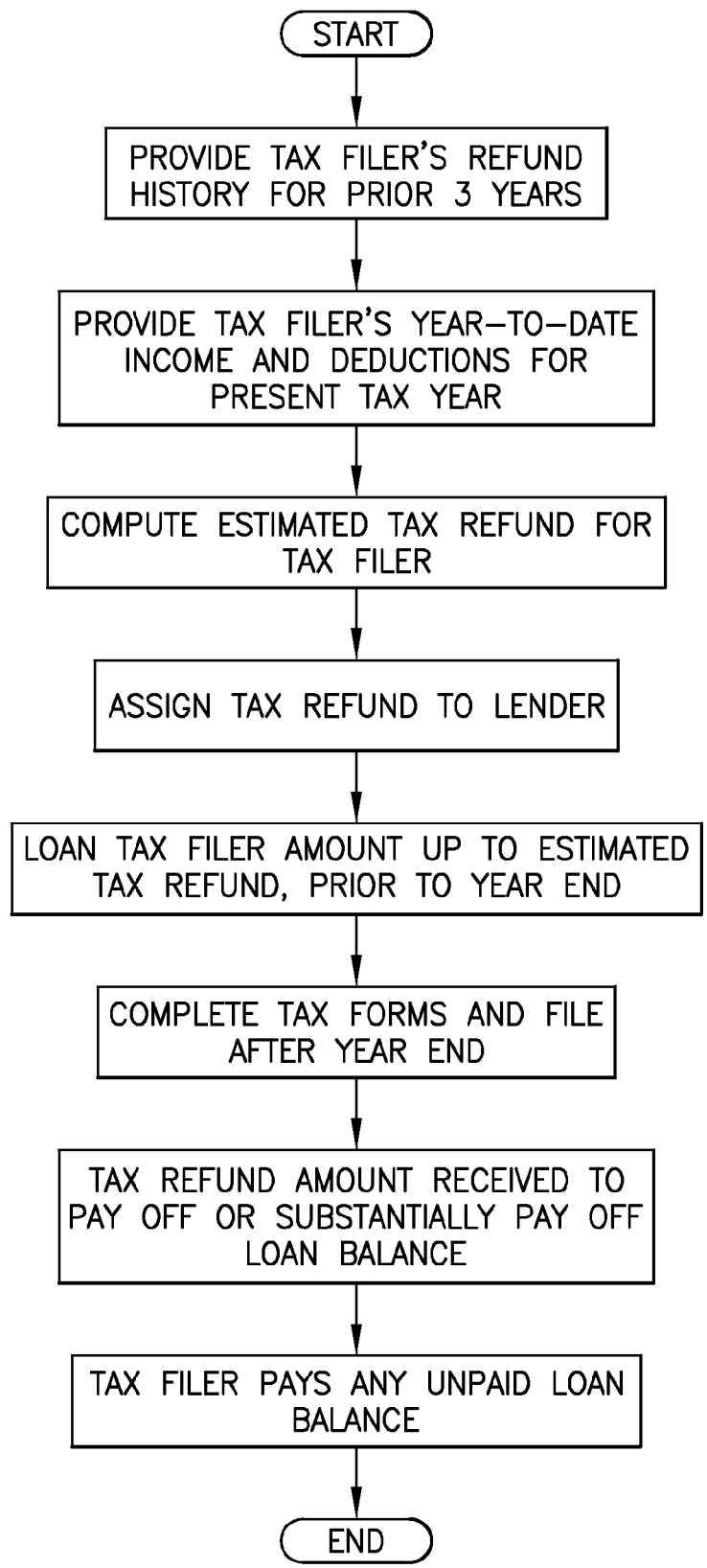
FIG. 1 is a flow diagram of a preferred embodiment of the present invention.
Figure 2:
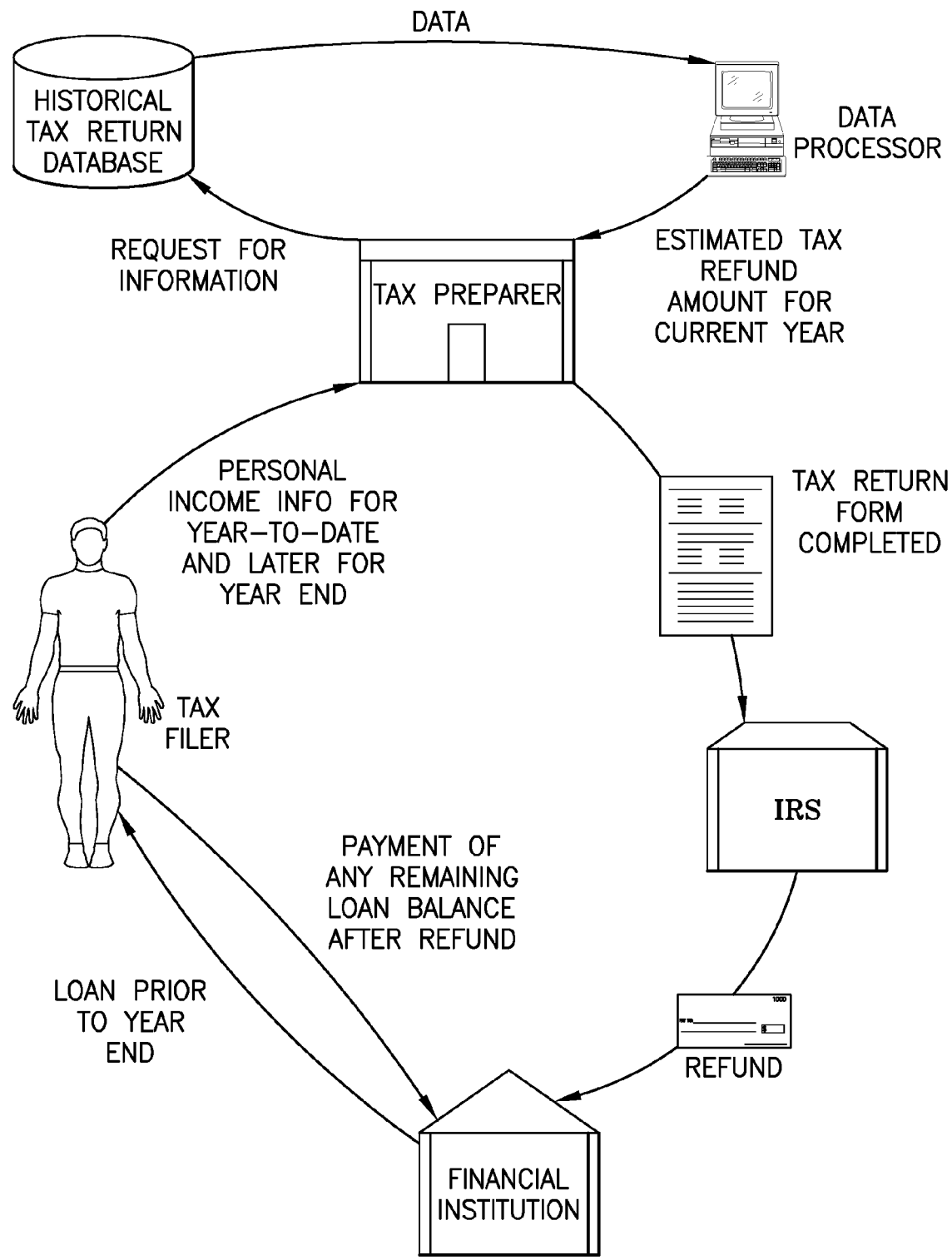
FIG. 2 is a schematic view of a preferred embodiment of the system of the present invention.

Referring now to the drawings, there is shown a preferred embodiment of the system of the present invention. With the present invention, a taxpayer may receive a loan in an amount estimated to be approximately the amount the taxpayer will receive in his or her tax refund from the taxing authority, and the loan will be given to the taxpayer prior to the end of the tax year (for example, the calendar year end), in time for the taxpayer to use the money for holiday expenses. Furthermore, because the loan is being given before the end of the tax year the taxpayer cannot yet file his or her tax return forms with the taxing authority because all of the information necessary to process the tax forms is not yet available.

In order to accomplish the present invention, a lending company preferably knows the estimated tax refund amount that the taxpayer should receive in subsequent months after filing his or her tax return. In order to do this, the loan granting entity preferably looks at the historical tax refund amount for that taxpayer. In other words, the loan granting entity may review recent years historical tax refund data for the taxpayer. In a preferred embodiment of the present invention the lending entity examines the last three years tax overpayments refunded to the taxpayer. With historical data the lending entity preferably then looks at the year to date income and other personal data for the taxpayer for that tax year. With the historical data and the year to date data for the current tax year, the loan granting entity can estimate with reasonable accuracy the tax refund amount that will be due the taxpayer for the current tax year. Under the present invention the lending entity preferably uses the first three quarters of the year or more, of year to date information from the taxpayer for the current tax year. With three quarters of the current tax year information available to the loan granting entity and with the historical tax data the lending entity is able to arrive at a reasonably accurate tax return amount due the taxpayer for the current tax year once the current tax year is over.

The lending entity may use computer software specially designed to assist in making the needed calculations to determine the estimated tax return amount due the taxpayer. Furthermore, the information used by the lending entity (such as the historical tax data) may be supplied by the taxpayer electronically, such as via a computer network, such as the Internet. Or, the taxpayer may supply the information in person at the lending office or elsewhere and the necessary calculations may be done manually such as accomplished in traditional tax preparation offices.

A preferred embodiment of the present invention will now be described in the way of an example. A taxpayer wishes to receive a pre-holiday loan in anticipation of his or her tax refund for the current tax year. The taxpayer takes his or her information to a tax preparer and/or to a lending entity offering the system of the present invention. In this example, the taxpayer provides the tax preparer with his or her last three years of tax return data, which would include the taxpayer's prior three years tax returns. If the taxpayer has used the same tax preparer for those prior three years, the tax preparer may have maintained a database of tax return information for that taxpayer as well as other taxpayers served by that tax preparer. In the latter case, the taxpayer would not have to supply the tax preparer with prior years tax information since the tax preparer would have that information readily available in a computerized database. For this example, assume that the taxpayer had an income of $32,000 in year 1996 and a $1,500 tax refund for that tax year. In 1997, assume that the taxpayer had a $34,000 annual income and a tax refund amount of $1,600. In 1998, assume that the taxpayer had an income of $38,500, and a tax refund amount of $1,850. Also assume that the taxpayer has given the tax preparer information for the current tax year that his or her income for the first nine months of the year has been $30,000. Extrapolating the current year to date income information, the tax preparer may assume that the taxpayer will earn $40,000 for the current year. If the taxpayer's tax deductions are not likely to significantly change for the current tax year, as compared to the prior three tax years, then a tax preparer may assume that the tax owed for the current tax year will be about the same percentage of income as in the prior three years, assuming that the tax rates have not changed. The tax preparer would also receive information about the nine months taxes paid by the taxpayer for the current tax year. If the taxpayer was having taxes withheld at the same rate as the prior three years, and factoring in the tax rates set by the taxing authority, after running the calculation to estimate the current tax year tax refund, the tax preparer may conclude that the taxpayer will receive a $1,900 tax refund for the current tax year after the current tax year is completed.

With this information, either the tax preparer or another lending entity may agree to provide the taxpayer with a tax refund loan in advance of the year end holidays for the current tax year. The process for granting loans in anticipation of a tax refund is well known to one of ordinary skill in the art. The unique distinctions with respect to the present invention are that the loan is granted before the end of the current tax year which to the present inventor's knowledge has never been done before, and the fact that the loan is granted on an estimated tax refund amount as opposed to being based on an actual completed tax form for a complete tax year.

The lending entity may be any entity able to process and supply the loan to the taxpayer. In a preferred embodiment the lending entity is a financial institution such as a bank or savings and loan. However, the lending entity would not have to be a financial institution and could be practically any entity able to loan money to a taxpayer. A professional tax preparer is also not essential to the purpose of the present invention, however it is preferred to use a professional tax preparer, such as H & R Block Tax Services. It is preferred to use a professional tax preparer because the taxpayer may have a prior relationship with the tax preparer and the tax preparer may have maintained a database of tax information related to that taxpayer. However, it should be recognized that the present invention may be accomplished without the services of a professional tax preparer. In another embodiment of the present invention a taxpayer may supply a lending entity with prior years tax return information for that taxpayer as well as year to date current tax year information to enable the lending entity to use the process of the present invention to provide the taxpayer with a pre-holiday current year loan in advance of the completion of the current tax year.

Having shown and described a preferred embodiment of the present invention, those skilled in the art will realize that many variations and modifications may be made to the described invention and still be within the scope of the claimed invention. Thus many of the elements indicated above may be altered or replaced by different elements which will provide the same or substantially the same result and fall within the spirit of the claimed invention. It is the intention therefore to limit the invention only as indicated by the scope of the claims.

What is claimed is:

1. A computerized system for providing a loan to a taxpayer prior to the end of the current tax year, comprising:
    historical income tax refund data for said taxpayer, said historical income tax refund data comprising income tax refund amount data for at least one year prior to the current year and in a computer;
    year-to-date income data for the current year, for said taxpayer, wherein said date is prior to the end of the current tax year and said year-to-date income data is in said computer;
    year-to-date expense data for the current year, for said taxpayer, wherein said date is prior to the end of the current tax year and said year-to-date expense data is in said computer;
    a process in said computer to determine prior to the end of the current tax year an estimated income tax refund amount for said taxpayer for said current tax year using said historical income tax refund data, said year-to-date income data for a date prior to the end of the current tax year, and said year-to-date expense data for a date prior to the end of the current tax year;
    a loan provided to said taxpayer prior to the end of said current tax year in an amount based on said estimated income tax refund amount for said current tax year for said taxpayer as determined by said computer; and
    an income tax refund for said current tax year, wherein said income tax refund is based on a tax return prepared using actual income and expense data and filed after said current tax year for said taxpayer and is applied to the balance of said loan based on said estimated income tax refund.

2. The system of claim 1 wherein said historical income tax refund data is determined in accordance with a trend analysis.

3. The system of claim 2 wherein said historical income tax refund data comprises the amount of said taxpayer's refund for the previous three years.

4. The system of claim 1 wherein said year to date income information for the current year comprises income data for the first three quarters of the year.

5. A computerized system for providing a loan to a taxpayer, comprising:
    historical income tax refund data for said taxpayer, said historical income tax refund data comprising income tax refund amount data for at least one year prior to the current year and in a computer;
    year-to-date income data for the current year, for said taxpayer, wherein said date is prior to the end of the current tax year and said year-to-date income data is in said computer;
    a process in said computer to determine prior to the end of the current tax year an estimated income tax refund amount for said taxpayer for said current tax year using said historical income tax refund data, said year-to-date income data for a date prior to the end of the current tax year, and said year-to-date expense data for a date prior to the end of the current tax year;
    a loan provided to said tax payer prior to the end of said current tax year in an amount based on said estimated income tax refund amount for said current tax year for said taxpayer as determined by said computer; and
    an income tax refund for said current tax year, wherein said income tax refund is based on a tax return prepared using actual income data and filed after said current tax year for said taxpayer and is applied to the balance of said loan based on said estimated income tax refund.

6. The system of claim 5 wherein said historical income tax refund data is determined in accordance with a trend analysis.

7. The system of claim 6 wherein said historical income tax refund data comprises the amount of said taxpayer's income tax refund for the previous three years.

8. The system of claim 5 wherein said year to date income information for the current year comprises income data for the first three quarters of the year.

9. A computerized system for providing a loan to a taxpayer, comprising:
   historical income tax refund data for said taxpayer, said historical income tax refund data comprising income tax refund amount data for at least one year prior to the current year and in a computer;
   present job verification data for said taxpayer, said present job verification data in said computer;
   a process in said computer to determine prior to the end of the current tax year an estimated income tax refund amount for said taxpayer for said current tax year using said historical income tax refund data and said present job verification data;
   a loan provided to said taxpayer prior to the end of said current tax year in an amount based on said estimated income tax refund amount for said current tax year for said taxpayer as determined by said computer; and
   an income tax refund for said current tax year, wherein said income tax refund is based on a tax return prepared using actual data and filed after said current tax year for said taxpayer and is applied to the balance of said loan based on said estimated income tax refund.

10. The system of claim 9 wherein said historical income tax refund data is determined in accordance with a trend analysis.

11. The system of claim 10 wherein said historical income tax refund data comprises the amount of said taxpayer's income tax refund for the previous three years.

12. The system of claim 9 wherein said present job verification data comprises data for estimating said taxpayers income for the current year.

13. A computerized system for providing a loan to a taxpayer prior to the end of the current tax year, comprising:
   income information up to a date prior to the end of the current tax year, for said taxpayer, said income information in a computer;
   expense information up to a date prior to the end of the current tax year, for said taxpayer, said expense information in said computer;
   an income tax refund amount for at least one tax year prior to the current tax year, said income tax refund amount in said computer;
   a process in said computer to determine prior to the end of the current tax year an estimated income tax refund amount for said taxpayer for said current tax year using said income information up to a date prior to the end of the current tax year, said expense information up to a date prior to the end of the current tax year, and said income tax refund amount for at least one tax year prior to the current tax year;
   a loan provided to said taxpayer prior to the end of said current tax year in an amount based on said estimated income tax refund amount for said current tax year for said taxpayer; and
   an income tax refund for said current tax year, wherein said income tax refund is based on a tax return prepared using actual income and expense data and filed after said current tax year for said taxpayer and is applied to the balance of said loan based on said estimated income tax refund.

14. The system of claim 13 wherein said income information for the current year comprises income data for the first three quarters of the year.

15. The system of claim 13 wherein said income information for the current year is extrapolated based on said taxpayers income from prior years.

16. The system of claim 13 wherein said estimated income tax refund amount for said taxpayer is determined in accordance with said taxpayer's withholding rate and taxing authority rates.

17. A computer-implemented method for providing a loan to a taxpayer prior to the end of the current tax year, said method comprising:
   determining an income tax refund amount for at least one tax year prior to the current tax year;
   estimating at a computer said taxpayer's income tax refund amount due for said current year prior to the end of said current tax year based on said income tax refund amount;
   providing a loan to said taxpayer prior to the end of the current tax year in amount based on said estimated income tax refund amount due for said current tax year for said taxpayer as determined by said computer;
   assigning said taxpayer's income tax refund to said lender;
   preparing a tax return for said taxpayer using actual data after the end of the current tax year;
   filing said tax return with a taxing authority;
   receiving said taxpayer's income tax refund from said taxing authority; and
   applying said taxpayer's income tax refund to said loan based on said estimated income tax refund.

18. The method of claim 17 wherein estimating said taxpayer's income tax refund amount comprises completing a trend analysis on said taxpayer's income tax refunds from a plurality of years prior to the current year.

19. The method of claim 17 wherein estimating said taxpayer's income tax refund amount comprises estimating said taxpayers income for the current year.

20. The method of claim 19 wherein estimating said taxpayer's income for the current year comprises extrapolating said taxpayer's income based on prior years.

* * * * *